(12) United States Patent
Bachl et al.

(10) Patent No.: US 9,705,713 B2
(45) Date of Patent: Jul. 11, 2017

(54) COMMUNICATION DEVICE AND METHOD FOR SIGNAL DETERMINATION IN RADIO COMMUNICATION

(71) Applicant: Intel Corporation, Santa Clara, CA (US)

(72) Inventors: Rainer W Bachl, Nuremberg (DE); Vinay V Nair, Nuremberg (DE); Michael A Ruder, Pommelsbrunn (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/229,898

(22) Filed: Aug. 5, 2016

(65) Prior Publication Data
US 2017/0070375 A1   Mar. 9, 2017

(30) Foreign Application Priority Data
Sep. 7, 2015   (EP) .................................... 15184089

(51) Int. Cl.
*H04B 1/10* (2006.01)
*H04L 27/01* (2006.01)
(Continued)

(52) U.S. Cl.
CPC .............. *H04L 27/01* (2013.01); *H04B 7/04* (2013.01); *H04B 7/0456* (2013.01); *H04J 11/00* (2013.01);
(Continued)

(58) Field of Classification Search
CPC ......... H04L 27/01; H04L 5/0032; H04B 7/04; H04B 7/0456; H04J 11/00; H04W 72/0453; H04W 88/08
See application file for complete search history.

(56) References Cited

U.S. PATENT DOCUMENTS

| | | | |
|---|---|---|---|
| 2009/0110048 A1 | 4/2009 | Luschi et al. | |
| 2010/0008412 A1* | 1/2010 | Ito ........................ | H04B 1/707 375/232 |

(Continued)

OTHER PUBLICATIONS

"European Application No. 15184089.9, Extended European Search Report filed Mar. 14, 2016", 9 pgs.
(Continued)

*Primary Examiner* — Tesfaldet Bocure
(74) *Attorney, Agent, or Firm* — Schwegman Lundberg & Woessner, P.A.

(57) ABSTRACT

A communication device is provided including a receiver to receive a signal set. A first equalizer equalizes the signal set in accordance with a first equalization process taking into account that the signal set includes an inter cell interference signal, thereby generating a first equalized signal set. A first calculating circuit is configured to calculate a predefined characteristic of the first equalized signal set. A second equalizer equalizes the signal set in accordance with a second equalization process taking into account that the signal set is free from an inter cell interference signal, thereby generating a second equalized signal set. A second calculating circuit is configured to calculate a predefined characteristic of the second equalized signal set. A selecting circuit is configured to select the first equalized signal set or the second equalized signal set for further processing based on the determined predefined characteristics.

20 Claims, 12 Drawing Sheets

(51) Int. Cl.
*H04L 5/00* (2006.01)
*H04B 7/04* (2017.01)
*H04W 72/04* (2009.01)
*H04J 11/00* (2006.01)
*H04B 7/0456* (2017.01)
*H04W 88/08* (2009.01)

(52) U.S. Cl.
CPC .......... *H04L 5/0007* (2013.01); *H04L 5/0032* (2013.01); *H04W 72/042* (2013.01); *H04W 72/0453* (2013.01); *H04W 88/08* (2013.01)

(56) References Cited

U.S. PATENT DOCUMENTS

| | | | |
|---|---|---|---|
| 2011/0032837 A1* | 2/2011 | Luschi | H04B 17/318 370/252 |
| 2011/0038407 A1* | 2/2011 | Ki | H04L 25/03305 375/232 |
| 2012/0087406 A1* | 4/2012 | Lim | H04J 11/004 375/232 |
| 2012/0300765 A1 | 11/2012 | Luschi et al. | |
| 2014/0247863 A1 | 9/2014 | Li | |

OTHER PUBLICATIONS

Durnais, Philippe, et al., "On the implementation of a multi-equalizer", The 3rd International IEEE-NEWCAS Conference, (Aug. 22, 2005), 4 pgs.

* cited by examiner

COMMUNICATION DEVICE AND METHOD FOR SIGNAL DETERMINATION IN RADIO COMMUNICATION

This application claims the benefit of priority of European Patent Application No. 15184089.9, filed on Sep. 7, 2015, the benefit of priority of which is claimed hereby, and which is incorporated by reference herein in its entirety.

TECHNICAL FIELD

The present disclosure relates to communication devices and methods for signal determination in radio communication.

BACKGROUND

In a scenario of signal interference of base stations associated to different mobile radio cells, the data rate transmitted by a serving base station of the base stations may decrease. In case of transmission channels that involve short groups of information bits, by way of example the Physical Downlink Control Channel (PDCCH) in the context of Orthogonal Frequency-Division Multiple Access (OFDMA) based Long Term Evolution (LTE) mobile radio communication networks, effective selection methods for an appropriate signal processing are desired.

SUMMARY

A communication device is provided including a receiver to receive a signal set. A first equalizer equalizes the signal set in accordance with a first equalization process taking into account that the signal set includes an inter cell interference signal, thereby generating a first equalized signal set. A first calculating circuit is configured to calculate a predefined characteristic of the first equalized signal set. A second equalizer equalizes the signal set in accordance with a second equalization process taking into account that the signal set is free from an inter cell interference signal, thereby generating a second equalized signal set. A second calculating circuit is configured to calculate a predefined characteristic of the second equalized signal set. A selecting circuit is configured to select the first equalized signal set or the second equalized signal set for further processing based on the determined predefined characteristics.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
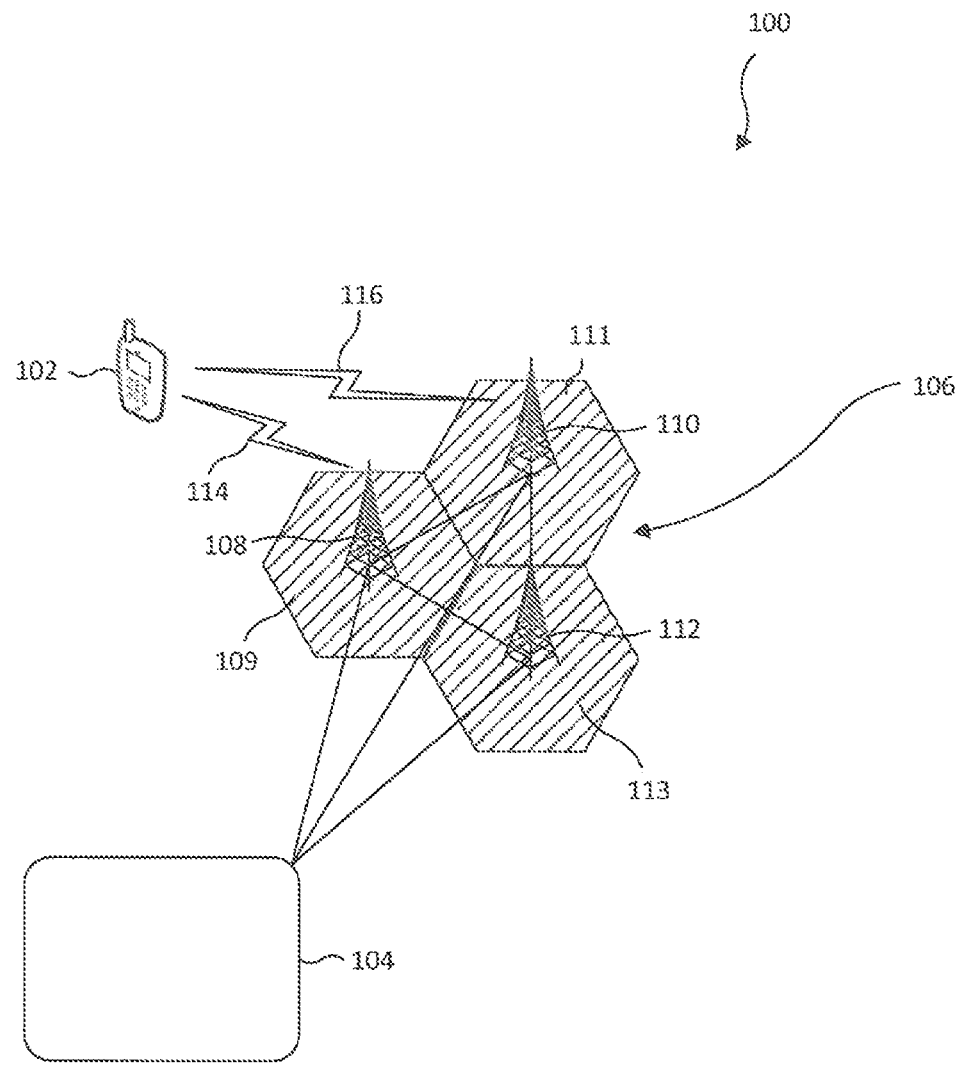
FIG. 1 shows a schematic diagram of a mobile radio communication system based on the Long Term Evolution (LTE) communication standard and a mobile phone according to an example.

The following detailed description refers to the accompanying drawings that show, by way of illustration, specific details and examples in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various aspects of this disclosure provide a receiver configured to receive a signal set. A first equalizer may be coupled to the receiver and configured to equalize the signal set in accordance with a first equalization process under the assumption that the signal set includes an inter cell interference signal and to thereby generate a first equalized signal set. Moreover, a first calculating circuit may be configured to calculate a predefined characteristic of the first equalized signal set, which may include a first set of softbits. Further, a second equalizer may be coupled to the receiver and configured to equalize the signal set in accordance with a second equalization process under the assumption that the signal set is free from an inter cell interference signal and to thereby generate a second equalized signal set. A second calculating circuit may be configured to calculate a predefined characteristic of the second equalized signal set, which may include a second set of softbits. Further, a selecting circuit may be configured to select the first equalized signal set or the second equalized signal set for further processing based on the determined predefined characteristics.

Thus a communication device with a simple structure may be provided that may perform well in scenarios of interfering signals. Further, the block error rate of the received signal set may be reduced. Moreover, the communication device may be flexibly used in scenarios of various types of radio communication signals. The inter cell interference signal may be a signal superimposed of signals originating in different mobile radio cells of a mobile radio communication system.

The communication device may be configured to communicate in accordance with GSM (Global System for Mobile Communications), UMTS (Universal Mobile Telecommunications Standard), LTE (Long Term Evolution) or LTE-Advanced or other mobile radio communication networks.

In an example, the communication device may further include a decoder coupled with the selecting circuit and configured to decode the softbits of the selected equalized signal set from the first equalized signal set or the second equalized signal set.

In an example, the decoder may include a Viterbi decoder.

In an example, the first equalization process may be a first Minimum Mean Square Error (MMSE) Equalization process. Further, the second equalization process may be a second Minimum Mean Square Error (MMSE) Equalization process.

In various aspects of this disclosure, the signal set may be a combined signal set superimposed of at least a first signal set transmitted by a first base station and a second signal set transmitted by a second base station.

In an example, the first base station may include a first set of transmit antennas configured to transmit over a first set of frequency resources. Further, the second base station may include a second set of transmit antennas configured to transmit over a second set of frequency resources. The first set of frequency resources and the second set of frequency resources are the same.

In an example, at least one of the first set of transmit antennas or the second set of transmit antennas may include a plurality of transmit antennas. Thus the transmission may become more reliable and/or less time-frequency resources or power may be required for the transmission.

In an example, at least one of the signal sets of the first signal set or the second signal set may be transmitted based on a Space Frequency Block Coding Scheme (SFBC), e.g. an Alamouti coding scheme. Thus the reliability of data transfer between the base station and user equipments may be increased.

In an example, the signal set may be a signal set in accordance with a Long Term Evolution communication technology, e.g. a signal set in accordance with a Long Term Evolution Advanced communication technology.

In various aspects of this disclosure, the signal set may be a Physical Downlink Control Channel (PDCCH) signal set. Thus a communication device that effectively reduces the block error rate in the PDCCH may be provided.

In an example, the first Minimum Mean Square Error Equalization process may be based on a first equalization matrix $F=H^H \cdot [H \cdot H^H + R^{Interf}]^{-1}$, wherein H is the serving cell channel matrix, in case of a plurality of transmit antennas a channel matrix according to an Alamouti coding scheme, $R^{Interf}$ is a noise covariance matrix assuming that the signal set includes an inter cell interference signal and $H^H$ denotes a Hermitian conjugate of the channel matrix H. Further, the second Minimum Mean Square Error Equalization process may be based on a second equalization matrix $F=H^H \cdot [H \cdot H^H + R^{NoInterf}]^{-1}$, wherein $R^{NoInterf}$ is a noise covariance matrix assuming that the signal set is free from an inter cell interference signal. Thus flexible means for determining an effective equalization method may be provided.

In an example, the predefined characteristic of the first equalized signal set may include determining a first unbiased signal set based on the first equalized signal set. Further, the predefined characteristic of the second equalized signal set may include determining a second unbiased signal set based on the second equalized signal set. Thus scaling effects on the equalization process may be avoided so that selection of the equalization process is effective.

In an example, the predefined characteristic of the first equalized signal set may include an average power of the first unbiased signal set. Further, the predefined characteristic of the second equalized signal set may include an average power of the second unbiased signal set. Thus the communication device may effectively select the equalized signal set. The average powers of the unbiased signal sets may be an average of the signal powers of the unbiased signal sets, respectively.

In an example, the predefined characteristic of the first equalized signal set may include a variance of the signal amplitudes of the first unbiased signal set in consideration of a mean value of the amplitudes of the first unbiased signal set. Further, the predefined characteristic of the second equalized signal set may include a variance of the signal amplitudes of the second unbiased signal set in consideration of a mean value of the amplitudes of the second unbiased signal set. Thus the selecting circuit may flexibly adapt the selection process to features of the signal set.

In various aspects of this disclosure, the selecting circuit may be configured to select the first equalized signal set for further processing in case the average power of the first unbiased signal set is smaller than the average power of the second unbiased signal set. Further, the selecting circuit may be configured to select the second equalized signal set for further processing in case the average power of the second unbiased signal set is smaller than the average power of the first unbiased signal set. Thus the communication device may perform well in case of strong interfering cells and of weak interfering cells. Further, a simple and effective communication device may be provided that selects the equalized signal sets according to the appropriate equalization process. The appropriate equalization process may be an equalization process that assumes interference in case the signal set includes an inter cell interference signal and assumes that the signal set is free from an inter cell interference signal in case of freedom of the signal set from an inter cell interference signal.

In an example, the selecting circuit may be configured to select the first equalized signal set for further processing in case the variance of the signal amplitudes of the first unbiased signal set is smaller than the variance of signal amplitudes of the second unbiased signal set. Further, the selecting circuit may be configured to select the second equalized signal set for further processing in case the variance of the signal amplitudes of the second unbiased signal set is smaller than the variance of the signal amplitudes of the first unbiased signal set. Thus a simple communication device is provided.

In an example, the selecting circuit may be configured to select the first equalized signal set for further processing in case the average power of the first unbiased signal set is smaller than the average power of the second unbiased signal set. Further, the selecting circuit may be configured to select the first equalized signal set for further processing in case the average power of the second unbiased signal set is smaller than the average power of the first unbiased signal set and the variance of the signal amplitudes of the first unbiased signal set is smaller than the variance of the signal amplitudes of the second unbiased signal set. Further, otherwise the selecting circuit may be configured to select the second equalized signal set for further processing. Thus, a communication device may be provided that selects the equalized signal set according to the appropriate equalization process in a highly effective manner. Further, the communication device may have a high reliability communication over a limited set of time-frequency resources with limited power over a large range of signal to interference ratios and over a large range of PDCCH power scaling relative to the reference signal power of a serving base station.

In an example, the frequency resources of the first set of frequency resources and the second set of frequency resources may correspond to subcarriers associated with a certain subcarrier bandwidth. Such subcarriers may be provided for example in an OFDM based communication technology. Thus, the base stations may communicate with the user equipment a fast and reliable way.

Furthermore, a method for signal determination in radio communication is provided. The method may include receiving a signal set. Further, the method may include equalizing the signal set using a first equalization process under the assumption that the signal set includes an inter cell interference signal, thereby generating a first equalized signal set. Moreover, the method may include determining a predefined characteristic of the first equalized signal set, which may include a first set of softbits. Further, the method may include equalizing the signal set using a second equalization process under the assumption that the signal set is free from the inter cell interference signal, thereby generating a second equalized signal set. Moreover the method may include determining a predefined characteristic of the second equalized signal set, which may include a second set of softbits. Further, the method may include selecting the first equalized signal set or the second equalized signal set for further processing based on the determined predefined characteristics. Thus, a simple method is provided that may perform well in scenarios of interfering signals. Further, the block error rate of the received signal set may be reduced. Moreover, the method may be flexibly used in scenarios of various types of radio communication signals. It should be noted that aspects described in the context of the previous examples may be analogously valid for the above provided method.

FIG. 1 shows a schematic diagram of a mobile radio communication system 100 based on the Long Term Evolution (LTE) communication standard and a mobile phone 102 according to a first example. The mobile radio communication system 100 may have a core network 104 and a radio access network 106 that includes several LTE base stations (evolved Node B, eNodeB) from which a first eNodeB 108 of a first cell 109, a second eNodeB 110 of a second cell 111 and a third eNodeB 112 of a third cell 113 are shown. The eNodeBs 108, 110, 112 may be connected with each other and with the core network 104, respectively. Further, the first eNodeB 108 may have one or more transmit antenna ports that may transmit signals of a first signal set 114 associated to a Physical Downlink Control Channel (PDCCH) over several time-frequency resources or subcarriers to the mobile phone 102, respectively. Moreover, the second eNodeB 110 may have one or more transmit antenna ports that may transmit signals of a second signal set 116 associated to the PDCCH over several time-frequency resources or subcarriers to the mobile phone 102, respectively. The eNodeBs 108 and 110 code the first signal set 114 and the second signal set 116 based on a Space Frequency Block Coding (SFBC) scheme (in case they transmit the signals via a plurality of transmit antenna ports), e.g. an Alamouti coding scheme. In case the first eNodeB 108 is the serving cell for the mobile phone 102 and the second eNodeB 110 is an interfering cell for the mobile phone 102, the first signal set 114 illustratively represents the desired signal and the second signal set 116 illustratively represents the interfering signal. However, in case the second eNodeB 110 is the serving cell for the mobile phone 102 and the first eNodeB 108 is an interfering cell for the mobile phone 102, the second signal set 116 illustratively represents the desired signal and the first signal set 114 illustratively represents the interfering signal.

Figure 2:
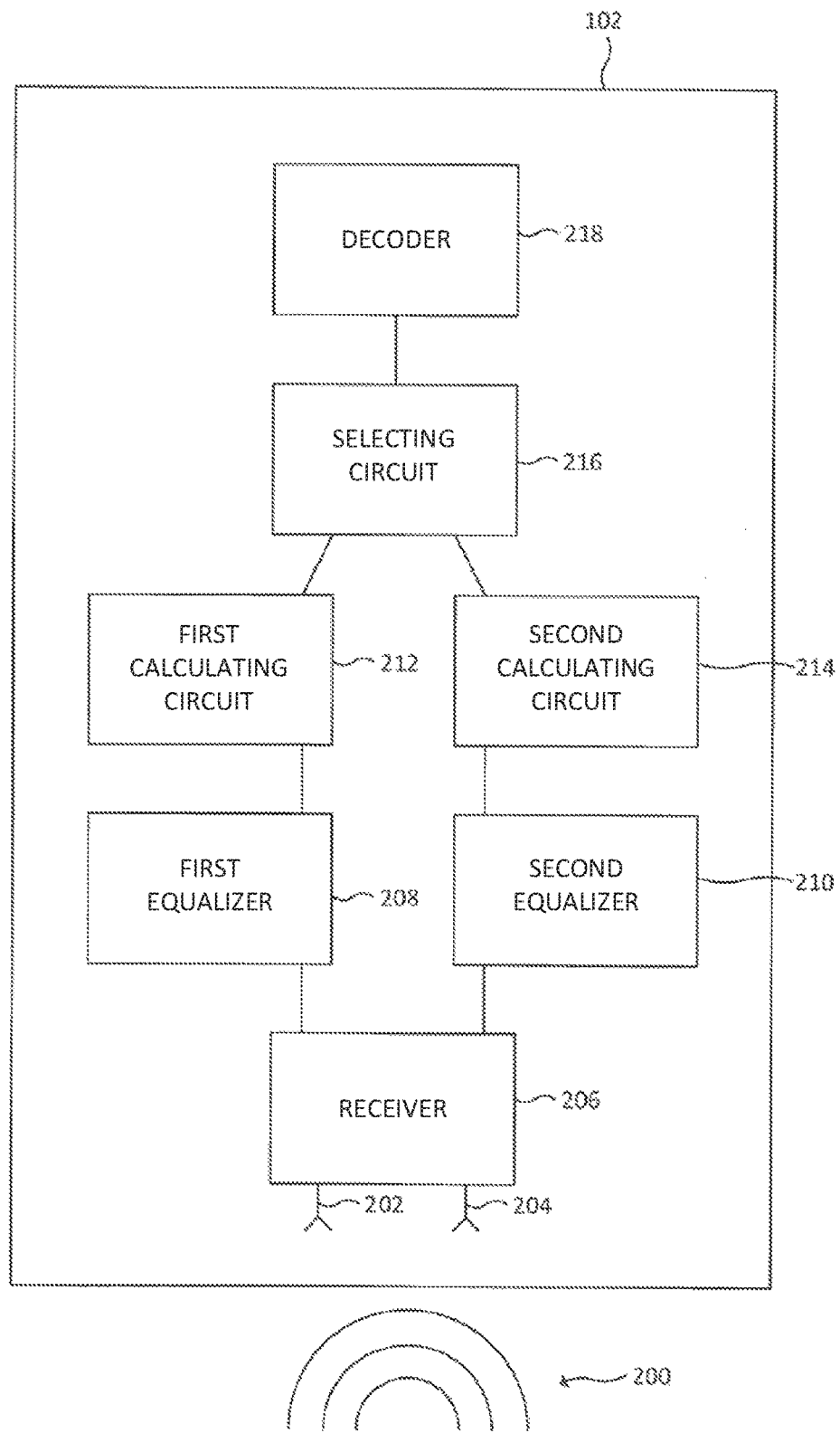
FIG. 2 shows a schematic diagram of elements of the mobile phone that are associated to processing a signal set of PDCCH signals in accordance with an LTE communication network.

FIG. 2 shows a schematic diagram of elements of the mobile phone 102 that are associated to processing a signal set 200 of PDCCH signals in accordance with the LTE communication network that the mobile phone 102 receives. The eNodeBs 108, 110, 112 may provide the signal set 200 which may include signals that are coded based on the Alamouti coding scheme. The eNodeBs 108, 110, 112 may transmit the signal set 200 over a plurality of subcarriers and via a plurality of transmit antenna ports. Further, the mobile phone 102 may include a first antenna 202, a second antenna 204, a frontend receiver 206, a first equalizer 208, a second equalizer 210, a first calculating circuit 212, a second calculating circuit 214, a selecting circuit 216 and a decoder 218. The first antenna 202 and the second antenna 204 may be coupled to the frontend receiver 206 and may receive the signals of the signal set 200. Further aspects of the elements of the mobile phone 102 are described in the context of FIG. 2 together with FIG. 3 to FIG. 9.

Figure 3:
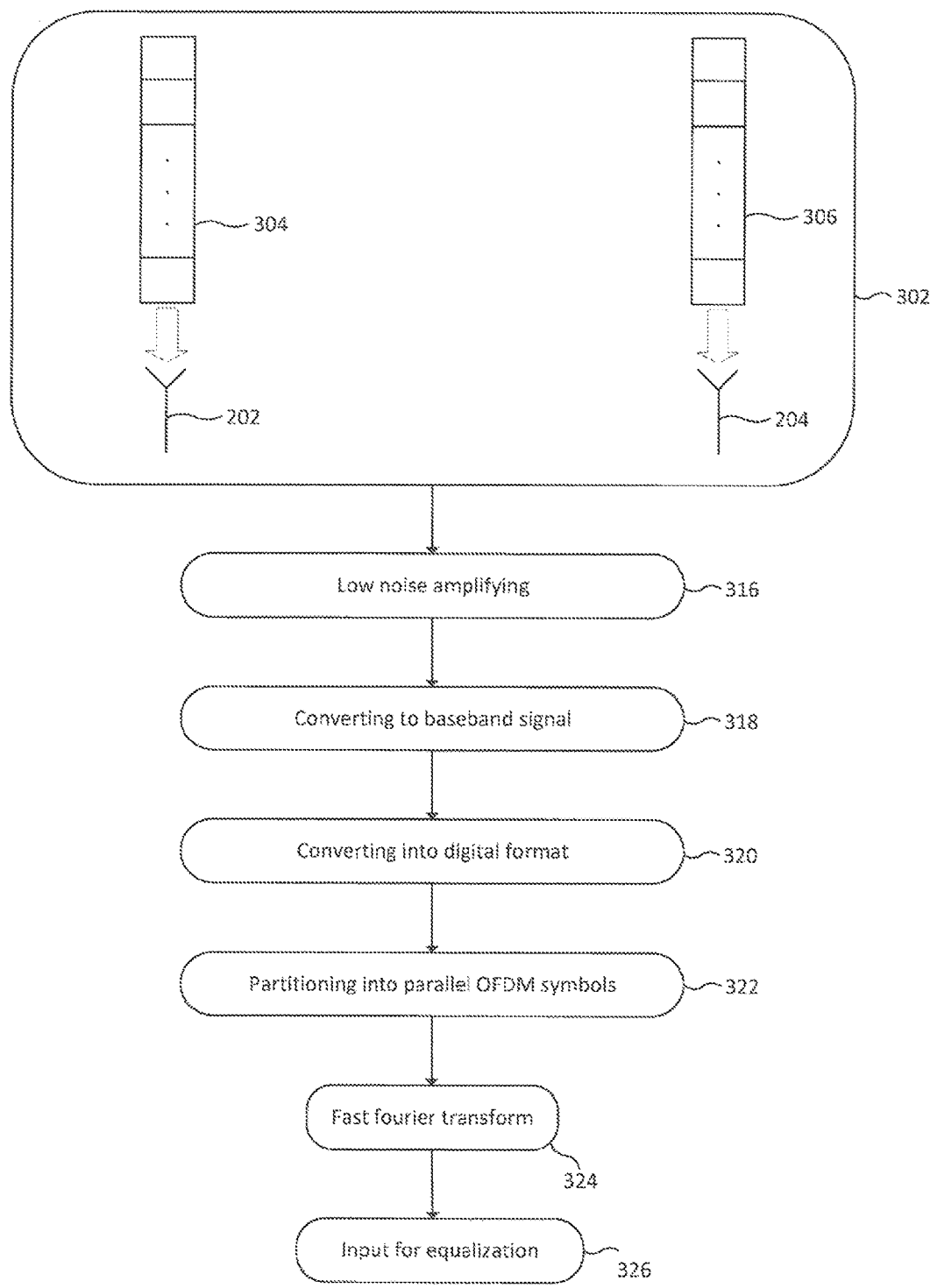
FIG. 3 shows a flow diagram for a processing of the received signal set by a receiver.

FIG. 3 shows a flow diagram for processing of the received signal set 200 by the frontend receiver 206. The method may be carried out by the mobile phone 102. In 302, the frontend receiver 206 may receive a first signal 304 via the first antenna 202 and a second signal 306 via the second antenna 204.

In 316, the frontend receiver 206 amplifies the signals of the signal set 200. In 318, the frontend receiver 206 converts the amplified signals to baseband signals. In 320, the frontend receiver 206 converts the converted signals to a digital format. In 322, the frontend receiver 206 partitions the digitized signals into parallel Orthogonal Frequency Division Multiplexing (OFDM) symbols. In 324, the frontend receiver 206 performs a Fast Fourier Transform (FFT) on the partitioned signals to generate transformed signals. In 326, the frontend receiver 206 applies the transformed signals to the first equalizer 208 and to the second equalizer 210.

Figure 4:
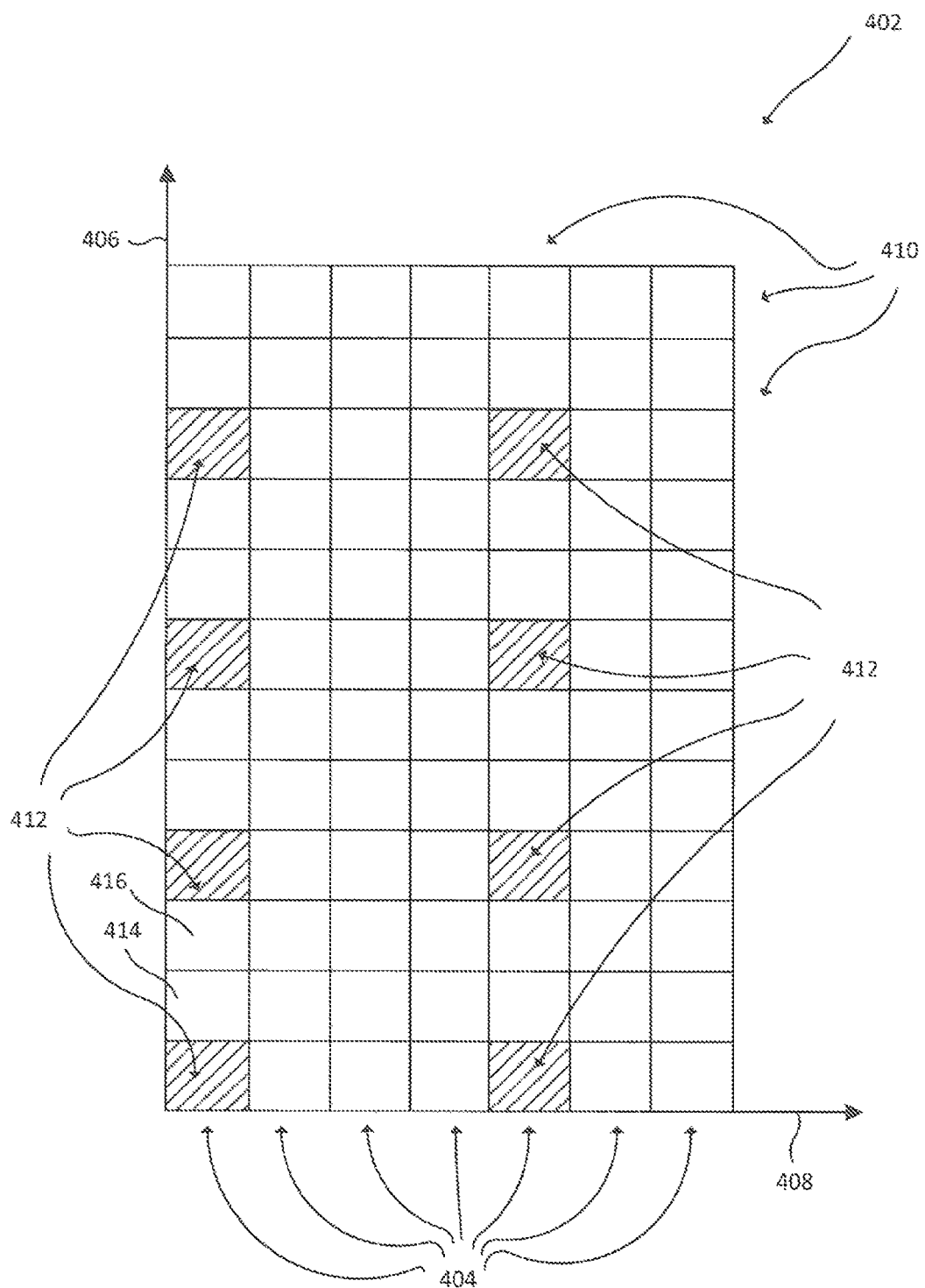
FIG. 4 shows a schematic diagram of a part of signals that is represented by a resource block.

FIG. 4 shows a schematic diagram of a part of the transformed signals (i.e. the signal provided as a result of the FFT) that is represented by a resource block 402. One column of the resource block 402 corresponds to one OFDM symbol 404. The resource block includes information distributed over twelve subcarrier frequencies, respectively. The subcarrier frequencies are indicated by an axis 406. Further, the OFDM symbols 404 are ordered by OFDM symbol numbers indicated by an arrow 408. For each of the OFDM symbols 404 the pieces of information that are associated to the subcarrier frequencies are referenced as Resource Elements (RE) 410, respectively. The REs 410 may be signals that include information from a plurality of resource signals of the signal set 200, respectively. Each of several resource signals $R_1$, $R_2$, $R_3$ and $R_4$ that include information for a first RE 414 may be transmitted by the antenna port(s) of one or several of the eNodeBs 108, 110, 112 to one receive antenna of the receive antennas 202, 204 of the mobile phone 102. Signals $r_k^{(0)}$ and $r_k^{(1)}$ of the first RE 414 with a frequency index k and signals $r_{k+1}^{(0)}$ and $r_{k+1}^{(1)}$ of a second RE 416 with a frequency index k+1 may be a linear combination of the resource signals $R_1$, $R_2$, $R_3$, $R_4$ and added noise. Aspects described for the REs 414 and 416 may apply similarly for other REs 410.

A plurality of REs may include Cell Reference Signals (CRS) 412, respectively, which are transmitted from one antenna port of one or several of the eNodeBs 108, 110 and 112. Based on information obtained from the CRSs 412 the frontend receiver 206 may determine and may provide a channel estimation per resource element (RE) 410, respectively. The channel characteristics may be described using channel coefficients between transmit antennas (for the interfering mobile radio cell and for the serving mobile radio cell, respectively) and receive antennas. Further, the signals $r_k^{(0)}$ and $r_k^{(1)}$ of the first RE 414 with a frequency index k and the signals $r_{k+1}^{(0)}$ and $r_{k+1}^{(1)}$ of a second RE 416 with a frequency index k+1 may be related to signals $s_0$ and $s_1$ that are sent by one of the eNodeBs 108, 110 in consideration of a channel matrix H and a noise and interference vector n by formula (1):

$$\begin{bmatrix} r_k^{(0)} \\ r_{k+1}^{(0)*} \\ r_k^{(1)} \\ r_{k+1}^{(1)*} \end{bmatrix} = \underline{H} \cdot \begin{bmatrix} s_0 \\ -s_1^* \end{bmatrix} + n. \quad (1)$$

It is to be noted that the dimensions of the matrices and vectors depend on the number of used receive and transmit antennas. In this example, SFBC is provided with two receive antennas (i.e. the transmission system consists of two or four transmit antennas and two receive antennas).

In the above example, the serving cell channel matrix H is a matrix of four rows and two columns and include the channel coefficients between every pair of transmit and receive antennas associated to the REs 414 and 416. The noise and interference vector n may be a vector corresponding to noise (which may be a white Gaussian noise) and interference of the REs 414, 416. Further, the frontend receiver 206 may transmit the transformed signals and the channel coefficients to the first equalizer 208 and the second equalizer 210.

Figure 5:
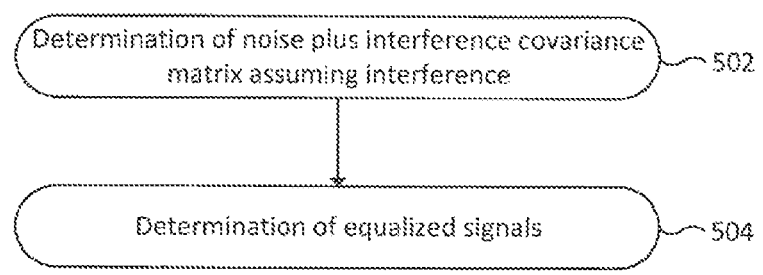
FIG. 5 shows a flow diagram for equalizing the signals by a first equalizer.

FIG. 5 shows a flow diagram for equalizing signals by the first equalizer 208. In 502, the first equalizer 208 may determine a noise covariance matrix under the assumption that the signal set 200 includes an inter cell interference signal that is superimposed of signals transmitted from eNodeBs 108, 110 associated to different mobile radio cells 109 and 111. The superimposed signals may include CRSs 412 associated to the same REs which is referred to by colliding interference. Further, the first equalizer 208 may determine and associate noise covariance matrices to REs with adjacent subcarriers, respectively. As an example, a noise plus interference covariance matrix $R^{Interf}$ associated to the REs 414 and 416 may be determined in consideration of a white noise covariance matrix $R_{nn(awgn)}$ and an interfering channel matrix $H_1$ for the signal transmission between the interfering cell and the mobile phone 102, $H_1^H$ denoting the Hermitian conjugate of $H_1$, by a formula (2):

$$R^{Interf} = H_1 \cdot H_1^H + R_{nn(awgn)}. \quad (2)$$

In 504, the first equalizer 208 may equalize resource element groups (REGs), each REG including four REs with adjacent subcarriers, based on a first Minimum Mean Square Error (MMSE) Equalization process according to which a first equalization matrix $F_1$ is determined for each RE pair of each REG by a formula (3), as described in the context of the REs 414 and 416:

$$F_1 = H^H \cdot [H \cdot H^H + R^{Interf}]^{-1}. \quad (3)$$

H of formula (3) is the interfering channel matrix for the signal transmission between the interfering cell and the mobile phone of a pair of REs of each REG as described in the context of the REs 414 and 416. Further, the first equalizer 208 may determine a first equalized signal set $s_b^{(1)}$ for the signals r of each adjacent pair of REs of each REG by a formula (4):

$$s_b^{(1)} = F_1 \cdot r. \quad (4)$$

The signals r of each adjacent pair of REs of each REG may be a four dimensional vector including signals $r_k^{(0)}$ and $r_k^{(1)}$ of a first RE of each REG with a frequency index k and signals $r_{k+1}^{(0)*}$ and $r_{k+1}^{(1)*}$ of a second RE of each REG with a frequency index k+1.

Figure 6:
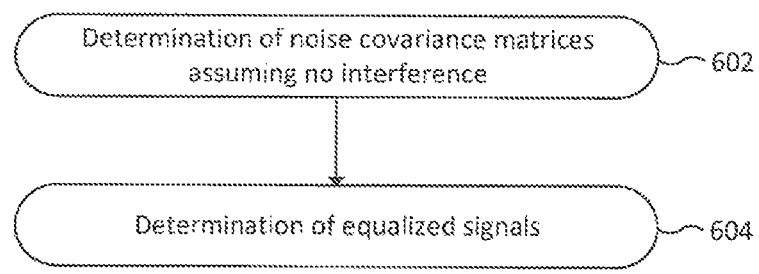
FIG. 6 shows a flow diagram in which the equalization of the signals by a second equalizer is shown.

FIG. 6 shows a flow diagram in which the equalization of signals by the second equalizer 210 is shown. In 602, the second equalizer 210 may determine one noise covariance matrix under the assumption that the signal set 200 is free from an inter cell interference signal. As an example, a noise plus interference covariance matrix $R^{NoInterf}$ associated to the REs 414 and 416 may be determined in consideration of the white noise covariance matrix $R_{nn(awgn)}$ by a formula (5):

$$R^{Interf} = R_{nn(awgn)}. \quad (5)$$

In 604, the second equalizer 210 may equalize resource element groups (REGs) based on a second Minimum Mean Square Error (MMSE) Equalization process according to which a second equalization matrix $F_2$ is determined for each RE pair of each REG by a formula (6), as described in the context of the REs 414 and 416:

$$F_2 = H^H \cdot [H \cdot H^H + R^{NoInterf}]^{-1}. \quad (6)$$

H of formula (6) is a channel matrix of a pair of REs of each REG as described in the context of the REs 414 and 416. Further, the second equalizer 210 may determine a second equalized signal set $s_b^{(2)}$ for the signals r of each adjacent pair of REs of each REG by a formula (7).

$$s_b^{(2)} = F_2 \cdot r. \quad (7)$$

The signals r of each adjacent pair of REs of each REG may be a four dimensional vector including signals $r_k^{(0)}$ and $r_k^{(1)}$ of a first RE of each REG with a frequency index k and signals $r_{k+1}^{(0)*}$ and $r_{k+1}^{(1)*}$ of a second RE of each REG with a frequency index k+1.

Figure 7:
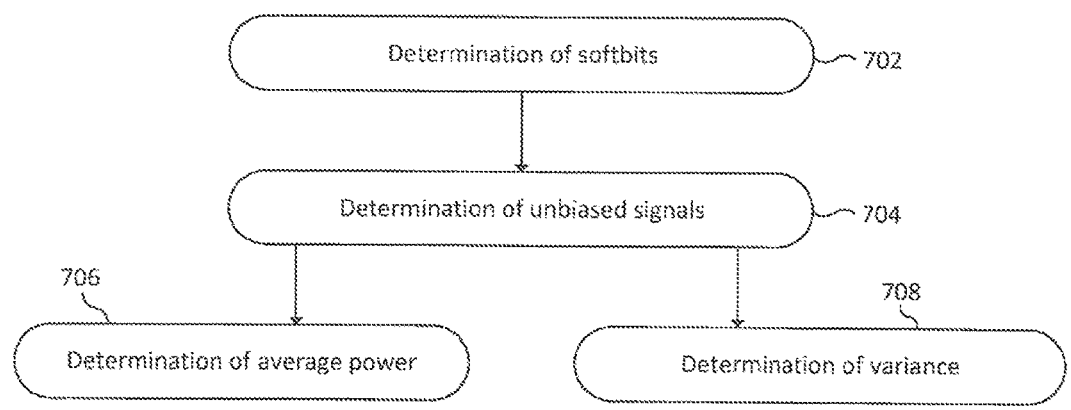
FIG. 7 shows a flow diagram that illustrates the functioning of a first calculating circuit.

FIG. 7 shows a flow diagram that illustrates the functioning of the first calculating circuit 212. In 702, the first calculating circuit 212 may determine softbits of the first equalized signal set $s_b^{(1)}$.

In 704, the first calculating circuit 212 may determine a first unbiased signal set $s_{ub}^{(1)}$ based on the first equalized signal set $s_b^{(1)}$ in consideration of a first matrix $C_1$ by a formula (8):

$$s_{ub}^{(1)} = C_1 \cdot s_b^{(1)}. \quad (8)$$

The first calculating circuit 212 may determine the matrix $c_1$ in consideration of the channel matrix H and the first equalization matrix $F_1$ such that scalings of elements of the first unbiased signal set $s_{ub}^{(1)}$ (in this case including two unbiased symbols) relative to the sent signals $s_0$ and $-s_1^*$ are removed.

In 706, the first calculating circuit 212 may determine a first average power $P_1$ in consideration of signals $s_{ub,0}^{(1)}$, $s_{ub,1}^{(1)}$, $s_{ub,2}^{(1)}$, and $s_{ub,3}^{(1)}$ of the first unbiased signal set $s_{ub,REG}^{(1)}$ (in this case including four unbiased symbols) of the corresponding REG by a formula (9):

$$P_1 = \frac{1}{4} \cdot \Sigma_{k=0}^{3} |s_{ub,k}^{(1)}|^2. \quad (9)$$

In 708, the first calculating circuit 212 may determine a first variance $\sigma_1^2$ in consideration of the amplitudes of the signals $s_{ub,0}^{(1)}$, $s_{ub,1}^{(1)}$, $s_{ub,2}^{(1)}$, and $s_{ub,3}^{(1)}$ of the first unbiased signal set $s_{ub,REG}^{(1)}$ (in this case including four unbiased symbols) and a first mean value $\bar{s}_1$ by a formula (10):

$$\sigma_1^2 = 1/4 \cdot \Sigma_{k=0}^3 ||s_{ub,k}^{(1)}| - \bar{s}_1|^2. \tag{10}$$

The first calculating circuit 212 may determine the first mean value $\bar{s}_1$ by a formula (11):

$$\bar{s}_1 = 1/4 \cdot \Sigma_{k=0}^3 |s_{ub,k}^{(1)}|. \tag{11}$$

Figure 8:
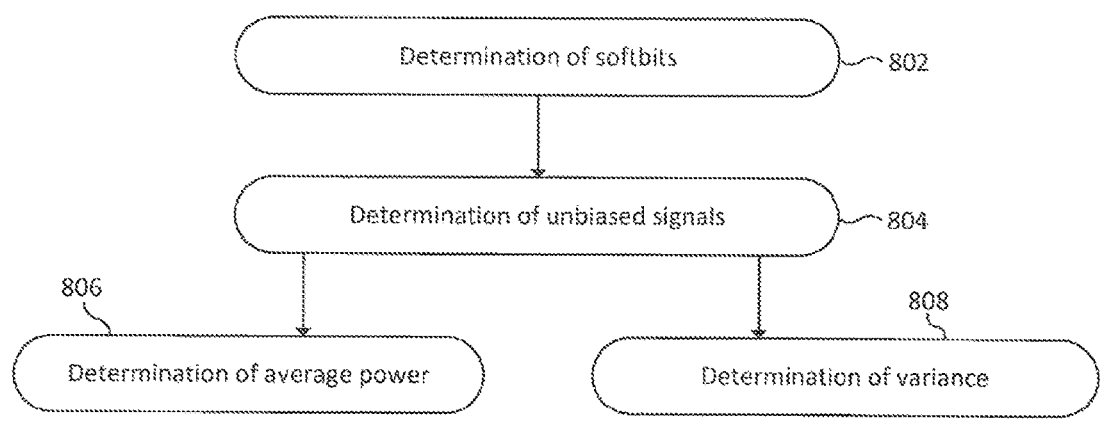
FIG. 8 shows a flow diagram illustrating the functioning of a second calculating circuit.

FIG. 8 shows a flow diagram illustrating the functioning of the second calculating circuit 214. In 802, the second calculating circuit 214 may determine softbits of the second equalized signal set $s_b^{(2)}$.

In 804, the second calculating circuit 214 may determine a second unbiased signal set $s_{ub}^{(2)}$ based on the second equalized signal set $s_b^{(2)}$ in consideration of a matrix $C_2$ by a formula (12):

$$s_{ub}^{(2)} = C_2 \cdot s_b^{(2)}. \tag{12}$$

The second calculating circuit 214 may determine the matrix $C_2$ in consideration of the channel matrix H and the second equalization matrix $F_2$ such that scalings of the elements of the second unbiased signal set $s_{ub}^{(2)}$ (in this case including two unbiased symbols) relative to the sent signals $s_0$ and $-s_1^*$ are removed.

In 806, the second calculating circuit 214 may determine a second average power $P_2$ in consideration of signals $s_{ub,0}^{(2)}$, $s_{ub,1}^{(2)}$, $s_{ub,2}^{(2)}$ and $s_{ub,3}^{(2)}$ of the second unbiased signal set $s_{ub,REG}^{(2)}$ (in this case including four unbiased symbols) of the corresponding REG by a formula (13):

$$P_1 = 1/4 \cdot \Sigma_{k=0}^3 |s_{ub,k}^{(2)}|^2. \tag{13}$$

In 808, the second calculating circuit 214 may determine a second variance $\sigma_2^2$ in consideration of the amplitudes of the signals $s_{ub,0}^{(2)}$, $s_{ub,1}^{(2)}$, $s_{ub,2}^{(2)}$ and $s_{ub,3}^{(2)}$ of the second unbiased signal set $s_{ub,REG}^{(2)}$ (in this case including four unbiased symbols) and a second mean value $\bar{s}_2$ by a formula (14):

$$\sigma_2^2 = 1/4 \cdot \Sigma_{k=0}^3 ||s_{ub,k}^{(2)}| - \bar{s}_2|^2. \tag{14}$$

The second calculating circuit 214 may determine the second mean value $\bar{s}_2$ by a formula (15):

$$\bar{s}_2 = 1/4 \cdot \Sigma_{k=0}^3 |s_{ub,k}^{(2)}|. \tag{15}$$

Figure 9:
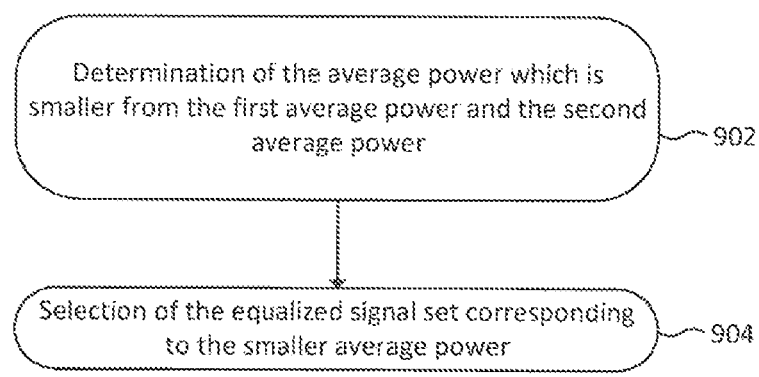
FIG. 9 shows a flow diagram illustrating the functioning of a selecting circuit.

FIG. 9 shows a flow diagram illustrating the functioning of the selecting circuit 216. In 902, the selecting circuit 216 (which may also be referred to as a first selecting circuit 216) may determine, if the average power $P_1$ of the first unbiased signal set $s_{ub}^{(1)}$ is smaller than the average power $P_2$ of the second unbiased signal set $s_{ub}^{(2)}$ or, if the average power $P_2$ of the second unbiased signal set $s_{ub}^{(2)}$ is smaller than the average power $P_1$ of the first unbiased signal set $s_{ub}^{(1)}$.

In 904, the selecting circuit 216 may select the first equalized signal set $s_b^{(1)}$ for further processing in case the average power $P_1$ is smaller than the average power $P_2$. Further, the selecting circuit 216 may select the second equalized signal set $s_b^{(2)}$ for further processing in case the average power $P_2$ of the second unbiased signal set $s_{ub}^{(2)}$ is smaller than the average power $P_1$ of the first unbiased signal set $s_{ub}^{(1)}$. If interference is present and the second equalizer 210 assumes that there is no interference, the erroneous noise plus interference covariance matrix $R^{NoInterf}$ used in the second equalizer 208 would not specifically suppress the contribution of the interference equalization results.

The selecting circuit 216 may transmit the softbits from the selected signal set for further processing to the decoder 218. The decoder 218 may be a Viterbi decoder.

Figure 10:
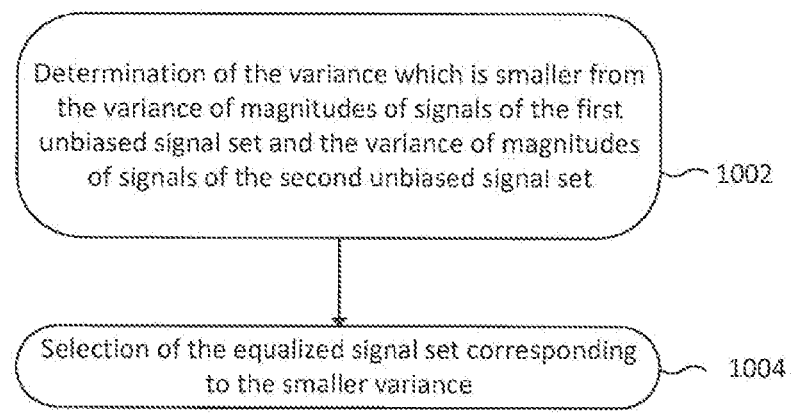
FIG. 10 shows a flow diagram illustrating the functioning of a second selecting circuit of a mobile phone according to a second example.

FIG. 10 shows a flow diagram illustrating the functioning of a second selecting circuit of a mobile phone according to a second example.

In 1002, the second selecting circuit may determine, if the variance $\sigma_1^2$ of amplitudes of signals of the first unbiased signal set $s_{ub}^{(1)}$ is smaller than the variance $\sigma_2^2$ of amplitudes of signals of the second unbiased signal set $s_{ub}^{(2)}$ or, if the variance $\sigma_2^2$ of amplitudes of signals of the second unbiased signal set $s_{ub}^{(2)}$ is smaller than the variance $\sigma_1^2$ of amplitudes of signals of the first unbiased signal set $s_{ub}^{(1)}$.

In 1004, the second selecting circuit may select the first equalized signal set $s_b^{(1)}$ for further processing in case the second selecting circuit 216 has determined that the variance $\sigma_1^2$ of amplitudes of signals of the first unbiased signal set $s_{ub}^{(1)}$ is smaller than the variance $\sigma_2^2$ of amplitudes of signals of the second unbiased signal set $s_{ub}^{(2)}$. Further, the second selecting circuit may select the second equalized signal set $s_b^{(2)}$ for further processing in case the variance $\sigma_2^2$ of amplitudes of signals of the second unbiased signal set $s_{ub}^{(2)}$ is smaller than the variance $\sigma_1^2$ of amplitudes of signals of the first unbiased signal set $s_{ub}^{(1)}$.

The variance of signal amplitudes tends to be higher in case an equalization process is used assuming an interference scenario although the signal set 200 is free from an inter cell interference signal. Further, the variance of signal amplitudes tends to be higher in case an equalization process is used assuming that the signal set 200 is free from an inter cell interference signal although the signal set 200 includes an inter cell interference signal. All other aspects of the mobile phone according to the second example are provided corresponding to those of the first example.

Figure 11:
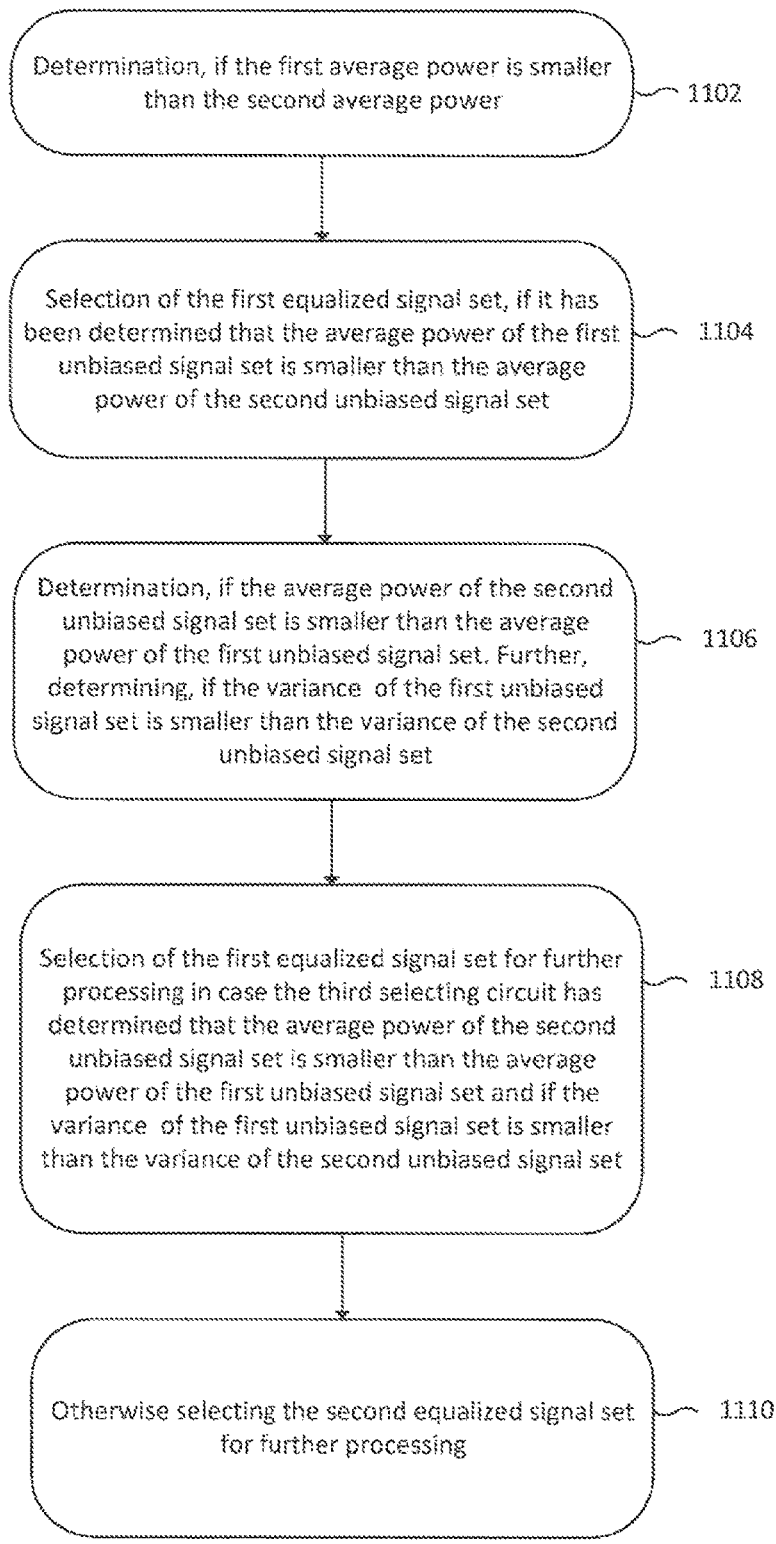
FIG. 11 shows a flow diagram illustrating the functioning of a third selecting circuit of a mobile phone according to a third example.

FIG. 11 shows a flow diagram illustrating the functioning of a third selecting circuit of a mobile phone according to a third example.

In 1102, the third selecting circuit may determine, if the average power $P_1$ of the first unbiased signal set $s_{ub}^{(1)}$ is smaller than the average power $P_2$ of the second unbiased signal set $s_{ub}^{(2)}$.

In 1104, the third selecting circuit may select the first equalized signal set $s_b^{(1)}$ for further processing, if the third selecting circuit has determined that the average power $P_1$ of the first unbiased signal set $s_{ub}^{(1)}$ is smaller than the average power $P_2$ of the second unbiased signal set $s_{ub}^{(2)}$.

In 1106, the third selecting circuit may determine, if the average power $P_2$ of the second unbiased signal set $s_{ub}^{(2)}$ is smaller than the average power $P_1$ of the first unbiased signal set $s_{ub}^{(1)}$. Further, the third selecting circuit may determine, if the variance $\sigma_1^2$ of the signal amplitudes of the first unbiased signal set $s_{ub}^{(1)}$ is smaller than the variance $\sigma_2^2$ of the signal amplitudes of the second unbiased signal set $s_{ub}^{(2)}$.

In 1108, the third selecting circuit may select the first equalized signal set $s_b^{(1)}$ for further processing in case the third selecting circuit has determined that the average power $P_2$ of the second unbiased signal set $s_{ub}^{(2)}$ is smaller than the average power $P_1$ of the first unbiased signal set $s_{ub}^{(1)}$, and if the variance $\sigma_1^2$ of the signal amplitudes of the first unbiased signal set $s_{ub}^{(1)}$ is smaller than the variance $\sigma_2^2$ of the signal amplitudes of the second unbiased signal set $s_{ub}^{(2)}$.

In 1110, the third selecting circuit may otherwise select the second equalized signal set $s_b^{(2)}$ for further processing. The mobile phone according to the third example effectively combines the effects of the selecting circuits according to the first and second example. All other aspects of the mobile phone according to the third example are provided corresponding to those of the first example.

Figure 12:
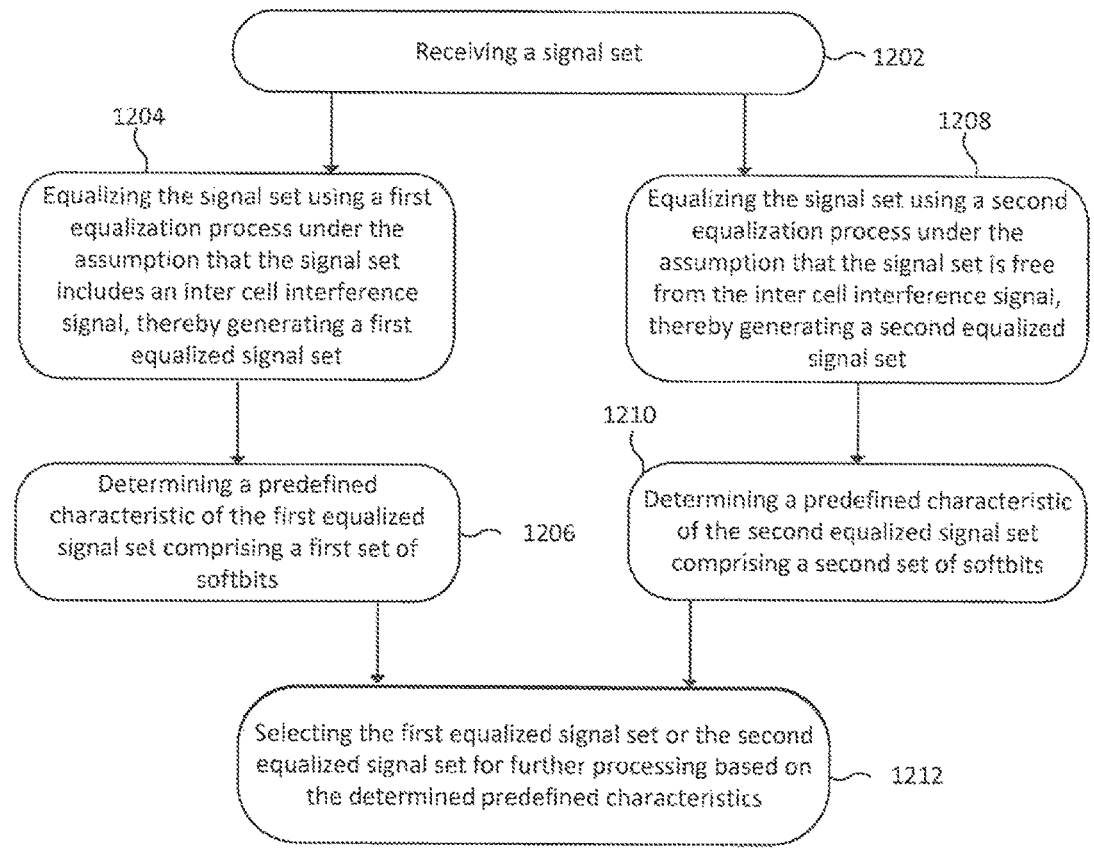
FIG. 12 shows a method for signal determination in radio communication.

FIG. 12 shows a method for signal determination in radio communication.

The method may include, in 1202, receiving a signal set.

The method may further include, in 1204, equalizing the signal set using a first equalization process under the assumption that the signal set includes an inter cell interference signal, thereby generating a first equalized signal set.

The method may further include, in 1206, determining a predefined characteristic of the first equalized signal set including a first set of softbits.

The method may further include, in 1208, equalizing the signal set using a second equalization process under the assumption that the signal set is free from the inter cell interference signal, thereby generating a second equalized signal set.

The method may further include, in 1210, determining a predefined characteristic of the second equalized signal set including a second set of softbits.

The method may further include, in 1212, selecting the first equalized signal set or the second equalized signal set for further processing based on the determined predefined characteristics.

Various aspects of this disclosure are particularly efficient in the context of colliding inter-cell interference. However, it should be noted that the various aspects of this disclosure are not limited to the context of colliding inter-cell interference, but can also be applied to a scenario of non-colliding inter-cell interference, for example, where the desired and interference PDCCH REGs are aligned differently.

In the following, various aspects of this disclosure will be illustrated:

Example 1 is a communication device. The communication device may include a receiver configured to receive a signal set and a first equalizer configured to equalize the signal set in accordance with a first equalization process taking into account that the signal set includes an inter cell interference signal and to thereby generate a first equalized signal set. The communication device may further include a first calculating circuit configured to calculate a predefined characteristic of the first equalized signal set and a second equalizer configured to equalize the signal set in accordance with a second equalization process taking into account that the signal set is free from an inter cell interference signal and to thereby generate a second equalized signal set. The communication device may further include a second calculating circuit configured to calculate a predefined characteristic of the second equalized signal set and a selecting circuit configured to select the first equalized signal set or the second equalized signal set for further processing based on the determined predefined characteristics.

In Example 2, the subject matter of Example 1 can optionally include that the first equalizer is coupled to the receiver and that second equalizer is coupled to the receiver.

In Example 3, the subject matter of any one of Examples 1 or 2 can optionally include that the first equalized signal set includes a first set of softbits and the second equalized signal set includes a second set of softbits. The communication device may further include a decoder coupled with the selecting circuit and configured to decode the softbits of the selected equalized signal set from the first equalized signal set or the second equalized signal set.

In Example 4, the subject matter of Example 3 can optionally include that the decoder includes a Viterbi decoder.

In Example 5, the subject matter of any one of Examples 1 to 4 can optionally include that the first equalization process is a first Minimum Mean Square Error (MMSE) Equalization process, and that the second equalization process is a second Minimum Mean Square Error (MMSE) Equalization process.

In Example 6, the subject matter of any one of Examples 1 to 5 can optionally include that the signal set is a combined signal set superimposed of at least a first signal set transmitted by a first base station and a second signal set transmitted by a second base station.

In Example 7, the subject matter of Example 6 can optionally include that the first base station includes a first set of transmit antennas configured to transmit over a first set of frequency resources and that the second base station includes a second set of transmit antennas configured to transmit over a second set of frequency resources, and that the first set of frequency resources and the second set of frequency resources are the same.

In Example 8, the subject matter of Example 7 can optionally include that the first set of transmit antennas includes at least one transmit antenna, and that the second set of transmit antennas includes at least one transmit antenna.

In Example 9, the subject matter of Example 8 can optionally include that at least one of the first set of transmit antennas or the second set of transmit antennas includes a plurality of transmit antennas, and that at least one of the signal sets of the first signal set or the second signal set are transmitted based on an Alamouti coding scheme.

In Example 10, the subject matter of any one of Examples 1 to 9 can optionally include that the signal set is a signal set in accordance with a Long Term Evolution communication technology.

In Example 11, the subject matter of any one of Examples 1 to 10 can optionally include that the signal set is a signal set in accordance with a Long Term Evolution Advanced communication technology.

In Example 12, the subject matter of any one of Examples 10 or 11 can optionally include that the signal set is a Physical Downlink Control Channel (PDCCH) signal set.

In Example 13, the subject matter of any one of Examples 5 to 12 can optionally include that the first Minimum Mean Square Error Equalization process is based on a first equalization matrix $F = H^H \cdot [H \cdot H^H + R^{Interf}]^{-1}$. H is a serving cell channel matrix according to an Alamouti scheme, $R^{Interf}$ is a noise covariance matrix assuming that the signal set includes an inter cell interference signal and $H^H$ denotes a Hermitian conjugate of the channel matrix. The second Minimum Mean Square Error Equalization process may be based on a second equalization matrix $F = H^H \cdot [H \cdot H^H + R^{Nointerf}]^{-1}$. $R^{Nointerf}$ is a noise variance matrix assuming that the signal set is free from an inter cell interference signal.

In Example 14, the subject matter of any one of Examples 1 to 13 can optionally include that the predefined characteristic of the first equalized signal set includes determining a first unbiased signal set based on the first equalized signal set, and that the predefined characteristic of the second equalized signal set includes determining a second unbiased signal set based on the second equalized signal set.

In Example 15, the subject matter of Example 14 can optionally include that the predefined characteristic of the first equalized signal set includes an average power of the first unbiased signal set, and that the predefined characteristic of the second equalized signal set includes an average power of the second unbiased signal set.

In Example 16, the subject matter of any one of Examples 14 or 15 can optionally include that the predefined characteristic of the first equalized signal set includes a variance of the signal amplitudes of the first unbiased signal set in consideration of a mean value of the amplitudes of the first unbiased signal set, and that the predefined characteristic of the second equalized signal set includes a variance of the signal amplitudes of the second unbiased signal set in consideration of a mean value of the amplitudes of the second unbiased signal set.

In Example 17, the subject matter of Example 16 can optionally include that the selecting circuit is configured to select the first equalized signal set for further processing in case the average power of the first unbiased signal set is smaller than the average power of the second unbiased signal set, and that the selecting circuit is configured to select the second equalized signal set for further processing in case the average power of the second unbiased signal set is smaller than the average power of the first unbiased signal set.

In Example 18, the subject matter of Example 16 can optionally include that the selecting circuit is configured to select the first equalized signal set for further processing in case the variance of the signal amplitudes of the first unbiased signal set is smaller than the variance of the second unbiased signal set, and that the selecting circuit is configured to select the second equalized signal set for further processing in case the variance of the signal amplitudes of the second unbiased signal set is smaller than the variance of the signal amplitudes of the first unbiased signal set.

In Example 19, the subject matter of Example 16 can optionally include that the selecting circuit is configured to select the first equalized signal set for further processing in case the average power of the first unbiased signal set is smaller than the average power of the second unbiased signal set, that the selecting circuit is configured to select the first equalized signal set for further processing in case the average power of the second unbiased signal set is smaller than the average power of the first unbiased signal set and the variance of the signal amplitudes of the first unbiased signal set is smaller than the variance of the signal amplitudes of the second unbiased signal set, or otherwise the selecting circuit is configured to select the second equalized signal set for further processing.

In Example 20, the subject matter of any one of Examples 7 to 19 can optionally include that the frequency resources of the first set of frequency resources and the second set of frequency resources are OFDM subcarriers.

Example 21 is a method for signal determination in radio communication. The method may include receiving a signal set, equalizing the signal set using a first equalization process taking into account that the signal set includes an inter cell interference signal, thereby generating a first equalized signal set, determining a predefined characteristic of the first equalized signal set, equalizing the signal set using a second equalization process taking into account that the signal set is free from the inter cell interference signal, thereby generating a second equalized signal set, determining a predefined characteristic of the second equalized signal set, and selecting the first equalized signal set or the second equalized signal set for further processing based on the determined predefined characteristics.

In Example 22, the subject matter of Example 21 can optionally include that the first equalized signal set includes a first set of softbits, and that the second equalized signal set includes a second set of softbits. The method may further include decoding the softbits of the selected signal from the first equalized signal set or the second equalized signal set.

In Example 23, the subject matter of Example 22 can optionally include that the decoder comprises a Viterbi decoder.

In Example 24, the subject matter of any one of Examples 21 to 23 can optionally include that the first equalization process is a first Minimum Mean Square Error (MMSE) Equalization process, and that the second equalization process is a second Minimum Mean Square Error (MMSE) Equalization process.

In Example 25, the subject matter of any one of Examples 21 to 24 can optionally include that the signal set is a combined signal superimposed of at least a first signal set transmitted by a first base station and a second signal set transmitted by a second base station.

In Example 26, the subject matter of Example 25 can optionally include that the first base station includes a first set of transmit antennas configured to transmit over a first set of frequency resources, and that the second base station includes a second set of transmit antennas configured to transmit over a second set of frequency resources.

In Example 27, the subject matter of Example 26 can optionally include that the first set of transmit antennas includes at least one transmit antenna, and that the second set of transmit antennas includes at least one transmit antenna.

In Example 28, the subject matter of Example 27 can optionally include that at least one of the first set of transmit antennas or the second set of transmit antennas includes a plurality of transmit antennas, and that at least one of the signal sets of the first signal set or the second signal set are transmitted based on an Alamouti coding scheme.

In Example 29, the subject matter of any one of Examples 21 to 28 can optionally include that the signal set is a signal set in accordance with a Long Term Evolution communication technology.

In Example 30, the subject matter of any one of Examples 21 to 29 can optionally include that the signal set is a signal set in accordance with a Long Term Evolution Advanced communication technology.

In Example 31, the subject matter of any one of Examples 29 or 30 can optionally include that the signal set is a physical downlink control channel (PDCCH) signal.

In Example 32, the subject matter of any one of Examples 21 to 31 can optionally include that the first Minimum Mean Square Error Equalization process is based on a first equalization matrix $F=H^H \cdot [H \cdot H + R^{Interf}]^{-1}$ H is a serving cell channel matrix according to an Alamouti scheme $R^{Interf}$ is a noise covariance matrix assuming that the signal set includes an inter cell interference signal and $H^H$ denotes a Hermitian conjugate of the serving cell channel matrix. The second Minimum Mean Square Error Equalization process may be based on a second equalization matrix $F=H^H \cdot [H \cdot H + R^{Nointerf}]^{-1}$. $R^{Nointerf}$ is noise covarince matrix assuming that the signal set is free from an inter cell interference signal.

In Example 33, the subject matter of any one of Examples 21 to 32 can optionally include that the predefined characteristic of the first equalized signal set includes determining a first unbiased signal set based on the first equalized signal set, and the predefined characteristic of the second equalized signal set includes determining a second unbiased signal set based on the second equalized signal set.

In Example 34, the subject matter of Example 33 can optionally include that the predefined characteristic of the first equalized signal set includes an average power of the first unbiased signal set, and that the predefined characteristic of the second equalized signal set includes an average power of the second unbiased signal set.

In Example 35, the subject matter of any one of Examples 32 or 33 can optionally include that the predefined characteristic of the first equalized signal set includes a variance of the signal amplitudes of the first unbiased signal set in consideration of a mean value of the amplitudes of the first unbiased signal set, and that the predefined characteristic of the second equalized signal set includes a variance of the signal amplitudes of the second unbiased signal set in consideration of a mean value of the amplitudes of the second unbiased signal set.

In Example 36, the subject matter of Example 35 can optionally include that the selecting circuit is configured to select the first equalized signal set for further processing in case the average power of the first unbiased signal set is smaller than the average power of the second unbiased signal set, and that the selecting circuit is configured to select the second equalized signal set for further processing in case the average power of the second unbiased signal set is smaller than the average power of the first unbiased signal set.

In Example 37, the subject matter of Example 36 can optionally include that the selecting circuit is configured to select the first equalized signal set for further processing in case the variance of the signal amplitudes of the first unbiased signal set is smaller than the variance of the signal amplitudes of the second unbiased signal set, and that the selecting circuit is configured to select the second equalized signal set for further processing in case the variance of the signal amplitudes of the second unbiased signal set is smaller than the variance of the first unbiased signal set.

In Example 38, the subject matter of Example 35 can optionally include that the selecting circuit is configured to select the first equalized signal set for further processing in case the average power of the first unbiased signal set is smaller than the average power of the second unbiased signal set, that the selecting circuit is configured to select the first equalized signal set for further processing in case the average power of the second unbiased signal set is smaller than the average power of the first unbiased signal set and the variance of the signal amplitudes of the first unbiased signal set is smaller than the variance of the signal amplitudes of the second unbiased signal set, or otherwise the selecting circuit is configured to select the second equalized signal set for further processing.

In Example 39, the subject matter of any one of Examples 26 to 37 can optionally include that the frequency resources of the first set of frequency resources and the second set of frequency resources are frequency bandwidths, and that the frequency bandwidths include pluralities of frequencies, respectively.

Example 40 is a communication device adapted for signal determination in radio communication. The communication device may include a receiver adapted to receive a signal set, and a first processing circuitry to equalize the signal set having an inter cell interference signal and to generate a first equalized signal set. The first processing circuitry is further adapted to calculate a predetermined characteristic of the first equalized signal set. The communication device may further include a second processing circuitry to equalize the signal set having no inter cell interference signal and to generate a second equalized signal set. The second processing circuitry is further adapted to calculate a predefined characteristic of the second equalized signal set. The communication device may further include a signal determination circuitry to determine the predefined characteristic of the first or second equalized signal set, and to thereby select the first or second equalized signal set for further processing.

In Example 41, the subject matter of Example 40 can optionally include that the first equalized signal set includes a first set of softbits, and that the second equalized signal set includes a second set of softbits. The communication device may further include a decoder coupled with the signal determination circuitry and configured to decode the softbits of the selected equalized signal set from the first equalized signal set or the second equalized signal set.

In Example 42, the subject matter of Example 41 can optionally include that the decoder includes a Viterbi decoder.

In Example 43, the subject matter of any one of Examples 40 to 42 can optionally include that the first equalization process is a first Minimum Mean Square Error (MMSE) Equalization process, and that the second equalization process is a second Minimum Mean Square Error (MMSE) Equalization process.

In Example 44, the subject matter of any one of Examples 40 to 43 can optionally include that the signal set is a combined signal set superimposed of at least a first signal set transmitted by a first base station and a second signal set transmitted by a second base station.

In Example 45, the subject matter of Example 44 can optionally include that the first base station includes a first set of transmit antennas configured to transmit over a first set of frequency resources, and that the second base station includes a second set of transmit antennas configured to transmit over a second set of frequency resources. The first set of frequency resources and the second set of frequency resources are the same.

In Example 46, the subject matter of Example 45 can optionally include that the first set of transmit antennas includes at least one transmit antenna, and that the second set of transmit antennas includes at least one transmit antenna.

In Example 47, the subject matter of Example 46 can optionally include that at least one of the first set of transmit antennas or the second set of transmit antennas includes a plurality of transmit antennas, and that at least one of the signal sets of the first signal set or the second signal set are transmitted based on an Alamouti coding scheme.

In Example 48, the subject matter of any one of Examples 40 to 47 can optionally include that the signal set is a signal set in accordance with a Long Term Evolution communication technology.

In Example 49, the subject matter of any one of Examples 40 to 48 can optionally include that the signal set is a signal set in accordance with a Long Term Evolution Advanced communication technology.

In Example 50, the subject matter of any one of Examples 48 or 49 can optionally include that the signal set is a Physical Downlink Control Channel (PDCCH) signal set.

In Example 51, the subject matter of any one of Examples 43 to 49 can optionally include that the first Minimum Mean Square Error Equalization process is based on a first equalization matrix $F=H^H \cdot [H \cdot H^H + R^{Interf}]^{-1}$. H is a serving cell channel matrix according to an Alamouti scheme, $R^{Interf}$ is a noise covariance matrix assuming that the signal set includes an inter cell interference signal and $H^H$ denotes a Hermitian conjugate of the channel matrix. The second Minimum Mean Square Error Equalization process is based on a second equalization matrix $F=H^H \cdot [H \cdot H^H + R^{Nointerf}]^{-1}$. $R^{Nointerf}$ is a noise covariance matrix assuming that the signal set is free from an inter cell interference signal.

In Example 52, the subject matter of any one of Examples 40 to 51 can optionally include that the predefined characteristic of the first equalized signal set includes determining a first unbiased signal set based on the first equalized signal set, and that the predefined characteristic of the second equalized signal set includes determining a second unbiased signal set based on the second equalized signal set.

In Example 53, the subject matter of Example 52 can optionally include that the predefined characteristic of the first equalized signal set includes an average power of the first unbiased signal set, and that the predefined characteristic of the second equalized signal set includes an average power of the second unbiased signal set.

In Example 54, the subject matter of any one of Examples 52 or 53 can optionally include that the predefined characteristic of the first equalized signal set includes a variance of the signal amplitudes of the first unbiased signal set in consideration of a mean value of the amplitudes of the first unbiased signal set, and that the predefined characteristic of the second equalized signal set includes a variance of the signal amplitudes of the second unbiased signal set in consideration of a mean value of the amplitudes of the second unbiased signal set.

In Example 55, the subject matter of Example 54 can optionally include that the signal determination circuitry is configured to select the first equalized signal set for further processing in case the average power of the first unbiased signal set is smaller than the average power of the second unbiased signal set, and that the signal determination circuitry is configured to select the second equalized signal set for further processing in case the average power of the second unbiased signal set is smaller than the average power of the first unbiased signal set.

In Example 56, the subject matter of Example 54 can optionally include that the signal determination circuitry is configured to select the first equalized signal set for further processing in case the variance of the signal amplitudes of the first unbiased signal set is smaller than the variance of the second unbiased signal set, and that the signal determination circuitry is configured to select the second equalized signal set for further processing in case the variance of the signal amplitudes of the second unbiased signal set is smaller than the variance of the signal amplitudes of the first unbiased signal set.

In Example 57, the subject matter of Example 56 can optionally include that the signal determination circuitry is configured to select the first equalized signal set for further processing in case the average power of the first unbiased signal set is smaller than the average power of the second unbiased signal set, that the signal determination circuitry is configured to select the first equalized signal set for further processing in case the average power of the second unbiased signal set is smaller than the average power of the first unbiased signal set and the variance of the signal amplitudes of the first unbiased signal set is smaller than the variance of the signal amplitudes of the second unbiased signal set, or that otherwise the signal determination circuitry is configured to select the second equalized signal set for further processing.

In Example 58, the subject matter of any one of Examples 45 or 57 can optionally include that the frequency resources of the first set of frequency resources and the second set of frequency resources are OFDM subcarriers.

Example 59 is a communication device. The communication device may include means for receiving a signal set, means for equalizing the signal set in accordance with a first equalization process taking into account that the signal set includes an inter cell interference signal and for thereby generating a first equalized signal set, means for calculating a predefined characteristic of the first equalized signal set, means for equalizing the signal set in accordance with a second equalization process taking into account that the signal set is free from an inter cell interference signal and for thereby generating a second equalized signal set, means for calculating a predefined characteristic of the second equalized signal set, and means for selecting the first equalized signal set or the second equalized signal set for further processing based on the determined predefined characteristics.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
a receiver configured to receive a signal set;
a first equalizer configured to equalize the signal set in accordance with a first equalization process taking into account that the signal set includes an inter cell interference signal and to thereby generate a first equalized signal set;
a first calculating circuit configured to calculate a predefined characteristic of the first equalized signal set;
a second equalizer configured to equalize the signal set in accordance with a second equalization process taking into account that the signal set is free from an inter cell interference signal and to thereby generate a second equalized signal set;
a second calculating circuit configured to calculate a predefined characteristic of the second equalized signal set;
a selecting circuit configured to select the first equalized signal set or the second equalized signal set for further processing based on the calculated predefined characteristics of the first and second equalized signal sets.

2. The communication device of claim 1, wherein the first equalized signal set comprises a first set of softbits;
wherein the second equalized signal set comprises a second set of softbits;
wherein the communication device further comprises a decoder coupled with the selecting circuit and configured to decode the softbits of the selected equalized signal set from the first equalized signal set or the second equalized signal set.

3. The communication device of claim 2, wherein the decoder comprises a Viterbi decoder.

4. The communication device of claim 1, wherein the first equalization process is a first Minimum Mean Square Error (MMSE) Equalization process; and
wherein the second equalization process is a second Minimum Mean Square Error (MMSE) Equalization process.

5. The communication device of claim 1, wherein the signal set is a combined signal set superimposed of at least a first signal set transmitted by a first base station and a second signal set transmitted by a second base station.

6. The communication device of claim 5, wherein the first base station comprises a first set of transmit antennas configured to transmit over a first set of frequency resources;
wherein the second base station comprises a second set of transmit antennas configured to transmit over a second set of frequency resources; and
wherein the first set of frequency resources and the second set of frequency resources are the same.

7. The communication device of claim 6, wherein at least one of the first set of transmit antennas or the second set of transmit antennas comprises a plurality of transmit antennas; and wherein the communication device is configured to transmit at least one of the signal sets of the first signal set or the second signal set using the at least one of the first set of transmit antennas or the second set of transmit antennas based on an Alamouti coding scheme.

8. The communication device of claim 1, wherein the signal set is a signal set in accordance with a Long Term Evolution communication technology.

9. The communication device of claim 8, wherein the signal set is a Physical Downlink Control Channel (PDCCH) signal set.

10. The communication device of claim 4, wherein the first Minimum Mean Square Error Equalization process is based on a first equalization matrix $F=H^H \cdot [H \cdot H^H + R^{Interf}]^{-1}$, wherein H is a serving cell channel matrix according to an Alamouti scheme, $R^{Interf}$ is a noise covariance matrix assuming that the signal set includes an inter cell interference signal and $H^H$ denotes a Hermitian conjugate of the channel matrix; and wherein the second Minimum Mean Square Error Equalization process is based on a second equalization matrix $F=H^H \cdot [H \cdot H^H + R^{Nointerf}]^{-1}$, wherein $R^{Nointerf}$ is a noise covariance matrix assuming that the signal set is free from an inter cell interference signal.

11. The communication device of claim 6, wherein the frequency resources of the first set of frequency resources and the second set of frequency resources are OFDM subcarriers.

12. A communication device adapted for signal determination in radio communication, the communication device comprising:

a receiver configured to receive a signal set, and a first processing circuitry configured to equalize the signal set having an inter cell interference signal and to generate a first equalized signal set, and to calculate a predefined characteristic of the first equalized signal set;

a second processing circuitry configured to equalize the signal set having no inter cell interference signal and to generate a second equalized signal set, and to calculate a predefined characteristic of the second equalized signal set; and a signal determination circuitry configured to select the first or the second equalized signal set for further processing based on the calculated predefined characteristics of the first and second equalized signal sets.

13. The communication device of claim 12, wherein the first equalized signal set comprises a first set of softbits; and wherein the second equalized signal set comprises a second set of softbits; wherein the communication device further comprises a decoder coupled with the signal determination circuitry and configured to decode the softbits of the selected equalized signal set from the first equalized signal set or the second equalized signal set.

14. The communication device of claim 12, wherein the signal set is a signal set in accordance with a Long Term Evolution communication technology.

15. The communication device of claim 14, wherein the signal set is a Physical Downlink Control Channel (PDCCH) signal set.

16. The communication device of claim 12, wherein the predefined characteristic of the first equalized signal set comprises determining a first unbiased signal set by removing, from the first equalized signal set, scalings resulting from application of a channel matrix, H, and an equalization matrix, $F_1$, to the received signal set; and wherein the predefined characteristic of the second equalized signal set comprises determining a second unbiased signal set by removing, from the second equalized signal set, scalings resulting from application of a channel matrix, H, and an equalization matrix, $F_2$ to the received signal set.

17. The communication device of claim 16, wherein the predefined characteristic of the first equalized signal set comprises an average power of the first unbiased signal set; and wherein the predefined characteristic of the second equalized signal set comprises an average power of the second unbiased signal set.

18. The communication device of claim 16, wherein the predefined characteristic of the first equalized signal set comprises a variance of the signal amplitudes of the first unbiased signal set in consideration of a mean value of the amplitudes of the first unbiased signal set; and wherein the predefined characteristic of the second equalized signal set comprises a variance of the signal amplitudes of the second unbiased signal set in consideration of a mean value of the amplitudes of the second unbiased signal set.

19. The communication device of claim 12, wherein:

the signal set is a combined signal set superimposed of at least a first signal set transmitted by a first base station and a second signal set transmitted by a second base station;

the first base station comprises a first set of transmit antennas configured to transmit over a first set of frequency resources;

the second base station comprises a second set of transmit antennas configured to transmit over a second set of frequency resources;

the first set of frequency resources and the second set of frequency resources are the same; and the frequency resources of the first set of frequency resources and the second set of frequency resources are OFDM subcarriers.

20. A communication device, comprising:

means for receiving a signal set;

means for equalizing the signal set in accordance with a first equalization process taking into account that the signal set comprises an inter cell interference signal and for thereby generating a first equalized signal set;

means for calculating a predefined characteristic of the first equalized signal set;

means for equalizing the signal set in accordance with a second equalization process taking into account that the signal set is free from an inter cell interference signal and for thereby generating a second equalized signal set;

means for calculating a predefined characteristic of the second equalized signal set; and means for selecting the first equalized signal set or the second equalized signal set for further processing based on the calculated predefined characteristics of the first and second equalized signal sets.

\* \* \* \* \*

UNITED STATES PATENT AND TRADEMARK OFFICE
CERTIFICATE OF CORRECTION

PATENT NO. : 9,705,713 B2
APPLICATION NO. : 15/229898
DATED : July 11, 2017
INVENTOR(S) : Bachl et al.

It is certified that error appears in the above-identified patent and that said Letters Patent is hereby corrected as shown below:

On the Title Page

In item (30), in "Foreign Application Priority Data", in Column 1, Line 1, delete "15184089" and insert --15184089.9-- therefor Signed and Sealed this
Twenty-eighth Day of April, 2020

Andrei Iancu
*Director of the United States Patent and Trademark Office*